US005714755A

United States Patent [19]

Wells et al.

[11] Patent Number: 5,714,755

[45] Date of Patent: Feb. 3, 1998

[54] MASS SCANNING METHOD USING AN ION TRAP MASS SPECTROMETER

[75] Inventors: Gregory J. Wells, Fairfield; Mingda Wang, Walnut Creek; Edward G. Marquette, Oakland, all of Calif.

[73] Assignee: Varian Associates, Inc., Palo Alto, Calif.

[21] Appl. No.: 609,364

[22] Filed: Mar. 1, 1996

[51] Int. Cl.$^6$ ........................ B01D 59/44; H01J 49/00

[52] U.S. Cl. ........................ 250/281; 250/292

[58] Field of Search ........................ 250/282, 292

[56] References Cited

U.S. PATENT DOCUMENTS

| | | | |
|---|---|---|---|
| 5,170,054 | 12/1992 | Franzen | 250/292 |
| 5,291,017 | 3/1994 | Wang et al. | 250/292 |
| 5,436,445 | 7/1995 | Kelly et al. | 250/282 |
| 5,448,061 | 9/1995 | Wells | 250/282 |
| 5,468,957 | 11/1995 | Franzen | 250/282 |
| 5,468,958 | 11/1995 | Franzen et al. | 250/292 |

*Primary Examiner*—Bruce Anderson
*Attorney, Agent, or Firm*—David Scharf; Edward Berkowitz

[57] ABSTRACT

An improved method of using an ion trap mass spectrometer is disclosed. According to the method an asymmetrical trapping field is applied to the trap. Preferably, the asymmetrical trapping field comprises a quadrupole field and a dipole field having the same frequency. In addition, higher order trapping field components, such as hexapole or octopole fields, may also be included, and the electrodes of the ion trap can be shaped to introduce such higher order field components. The effect of the asymmetrical trapping field of the present invention is to cause the center of the trapping field to be displaced from the mechanical center of the ion trap. A supplemental quadrupole field is then applied to the ion trap, the center of the supplemental quadrupole field being located at the mechanical center of the trap, i.e., it is displaced from the center of the trapping field. The supplement quadrupole field and the trapping field may be viewed as forming one combined field which acts upon the ions in the trap. The combined field is then scanned to cause ions of differing masses to be resonantly ejected from the ion trap in sequential mass order. Preferably, the combined field is scanned by scanning the voltage of the trapping field. Preferably, the supplemental field is set to have a frequency which is two-thirds of the trapping field frequency and is phase locked with the trapping field frequency.

31 Claims, 4 Drawing Sheets

FIG. I

MASS SCANNING METHOD USING AN ION TRAP MASS SPECTROMETER

FIELD OF THE INVENTION

The present invention is related to improved methods of using quadrupole ion trap mass spectrometers, and is particularly related to improved methods of obtaining mass spectra of ions which have been isolated within ion trap spectrometers.

BACKGROUND OF THE INVENTION

The present invention relates to methods of using the three-dimensional ion trap mass spectrometer ("ion trap") which was initially described by Paul, et al.; see, U.S. Pat. No. 2,939,952. In recent years, use of the ion trap mass spectrometer has grown dramatically, in part due to its relatively low cost, ease of manufacture, and its unique ability to store ions over a large range of masses for relatively long periods of time.

As is well known, the ion trap comprises a ring-shaped electrode and two end cap electrodes. In the ideal embodiment of Paul, et al., both the ring electrode and the end cap electrodes have hyperbolic surfaces that are coaxially aligned and symmetrically spaced. More recently it has been shown that by using non-hyperbolic surfaces, higher order field components can be deliberately introduced into the trapping field. By higher order field components it is meant field components greater than the normal quadrupole field, e.g., hexapolar or octopolar fields. (See, for example, U.S. Pat. No. 5,468,958 to Franzen, et al.) By placing a combination of RF and DC voltages (conventionally designated "V" and "U", respectively) on the trap electrodes, a trapping field is created. In the simplest case, a trapping field is simply created by applying a fixed frequency (conventionally designated "f") RF voltage between the ring electrode and the end caps to create a quadrupole trapping field. It is well known that by using an RF voltage of proper frequency and amplitude, a wide range of masses can be simultaneously trapped.

In its basic mode of operation, sample ions are introduced in the ion trap (i.e., the volume defined by the ion trap electrodes) and are then scanned out of the trap for mass detection. Commonly, sample is introduced into the trap from the output of a gas chromatograph ("GC"), although other sources of sample molecules, such as the output from a liquid chromatograph ("LC"), are also well known. Sample ions are normally created from sample molecules that are present within the trap, as by electron impact ("EI") or chemical ionization ("CI"). However, sample ions could also be created outside the trap and thereafter transported to within the trap volume. Various methods of creating and, if applicable, transporting sample ions, including ions used in so-called MS/MS experiments, are well-known in the art and need not be explained in further detail.

As noted, the ion trap is capable of storing sample ions over a large range of masses. After the sample ions are stored in the trap and, if applicable, any additional experimental manipulations are conducted (e.g., as in an MS/MS technique) the spectroscopist is generally interested in obtaining a mass spectrum of the contents of the trap in order to identify the ions that are present. While various detection techniques are known for obtaining the mass spectrum, most of the methods use some form of scanning of the ion trap. The present invention is directed to a new, high resolution method of scanning the contents of the ion trap to obtain a mass spectrum. A typical scanning method involves causing the trapped ions to leave the trap in consecutive mass order, and using an external detector to measure the quantity of ions leaving the trap as a function of time. Typically, ions are ejected through perforations in one of the end cap electrodes and are detected with an electron multiplier. More elaborate experiments, such as MS/MS, generally build upon this basic technique, and often require the isolation and/or manipulation of specific ion masses, or ranges of ion masses in the ion trap.

(It is common in the field to speak of the "mass" of an ion as shorthand for its mass-to-charge ratio. As a practical matter, most of the ions in an ion trap are singly ionized, such that the mass-to-charge ratio is the same as the mass. For convenience, this specification adopts the common practice, and generally uses the term "mass" as shorthand to mean mass-to-charge ratio.)

In U.S. Pat. No. 4,540,884, to Stafford, et al., there is disclosed a so-called "mass instability" scanning method whereby the contents of the ion trap are scanned out of the ion trap by changing the trapping field parameters, e.g., by raising the trapping voltage, such that ions of different masses become sequentially unstable and leave the trap.

U.S. Pat. No. 4,736,101, to Syka, et al., discloses a scanning method which relies on the fact that each ion in the trapping field has a "secular" frequency which depends on the mass of the ion and on the trapping field parameters. As had been well known, it is possible to excite ions of a given mass that are stably held by the trapping field by applying a supplemental AC dipole voltage to the ion trap having a frequency equal to the secular frequency of the ion mass. Ions in the trap can be made to resonantly absorb energy in this manner. At sufficiently high voltages, sufficient energy is imparted by the supplemental dipole voltage to cause those ions having a secular frequency matching the frequency of the supplemental voltage to be ejected from the trap volume. This technique is now commonly used to scan the trap by resonantly ejecting ions from the trap for detection by an external detector. (In addition, this technique may be used to eliminate unwanted ions from the ion trap, or when the supplemental dipole voltage is relatively low, it can be used in an MS/MS experiment to cause ions of a specific mass to resonate within the trap, undergoing dissociating collisions with molecules of a background.)

In practice, the scanning method of Syka, et al., is implemented by scanning the trapping voltage (thereby varying the secular frequency of the ions) using a fixed supplemental dipole voltage. The teachings of Syka, et al., are limited to dipole excitation fields since the supplemental voltage can only be applied out of phase where the "end caps are common mode grounded through coupling transformer 32 . . . to resonate trapped ions at their axial resonant frequencies." Syka, et al., discloses only the use of the fundamental (N=0) secular axial dipole resonance.

In commercial embodiments of the ion trap using resonance ejection as taught by Syka, et al., as a scanning technique, the frequency of the supplemental AC voltage is set at approximately one half of the frequency of the RF trapping voltage. It can be shown that the relationship of the frequencies of the trapping voltage and the supplemental voltage determines the mass value of ions that are at resonance. To achieve good mass resolution under the method of Syka, et al., it is desirable to use as low a supplemental voltage as is possible, while still of sufficient value to cause ejection of the ions. However, the growth in amplitude of the excited ions is linear in time, and the use of a low voltage, therefore, results in a slow ejection time.

In other words there is a trade-off between mass resolution and ejection time, both of which are determined by the magnitude of the supplemental dipole voltage.

The teachings of Stafford, et al., and Syka, et al., are limited to a pure quadrupole trapping field in an ideal ion trap. In such systems the trapped ions orbit about the mechanical center of the ion trap, which is also the center of the trapping field. In virtually all commercial ion traps a damping gas is introduced into the system to "thermalize" the ions, i.e., to reduce the spread in the initial ion condition and thereby improve resolution. When using a symmetrical trapping field, damping of the ions causes their orbits to collapse to a small volume near the center of the trap.

U.S. Pat. No. 5,381,007, to Kelley, discloses a scanning method which uses two quadrupole (or higher order) trapping fields having identical spatial form. (Each of the trapping fields is said to be capable of independently trapping ions in the ion trap.) The second quadrupole trapping field is used to resonantly excite trapped ions, and is said to have a frequency which is below one half of the fundamental trapping field frequency. As had been taught in U.S. Pat. No. 3,065,640 to Langmuir, et al., a quadrupole field can be used in the same manner as a dipole field to resonantly excite ions in a trap. (In fact, Langmuir, et al., and other references teach the use of both supplemental dipole and quadrupole fields for this purpose.) Langmuir, et al., further teach that while a supplemental dipole field causes the axial amplitude of the excited ions to increase linearly with time, a supplemental quadrupole field causes the ion motion to increase exponentially with time. The ability of a supplemental quadrupole field to cause ejection of the ions more rapidly suggests a clear advantage of using such a field. However, unlike a dipole field, a supplemental quadrupole field has no effect at the very center of the ion trap, which is where trapped ions tend to reside.

A disadvantage of Kelley is the fact that it requires the use of two trapping fields. As noted above in respect to the method of Syka, et al., a resonant excitation that is too intense will cause poor mass resolution. Yet, in order for the supplemental quadrupole field to act as a trapping field it must be rather strong, thereby causing severe broadening of the mass peak during the ejection process. Thus, unless a technique is used to move the ions away from the center of the ion trap, the method of Kelley must rely on processes such as random ion scattering and space charge repulsion to move ions away from the center of the trap and into an area where they can be excited by the supplemental quadrupole field. These processes result in poor mass resolution due to the incoherence and randomness of the displacement mechanisms.

U.S. Pat. No. 5,298,746, to Franzen, et al., teaches the use of a weak dipole field to move ions away from the center of the ion trap where they can then be resonantly excited by a supplemental quadrupole (or higher order) excitation field. Thus, this technique uses both a supplemental dipole field and a supplemental quadrupole field to excite ions. Each of these supplemental fields is set to resonantly excite ions of the same mass.

When any of the foregoing methods are used to scan the trap, ions are equally likely to move in either direction along the trap axis. Thus, half of the ions will move in the axial direction away from the detector and the other half will move toward the detector. This significantly limits the detection efficiency of the device. In addition, each of these techniques results in the storage of positive and negative ions (of the same mass) together, which can result in the undesired detection of negative ions when scanning the positive ion spectrum. This is a particular problem at higher masses where the energy of the ions that are ejected can be on the order of several kilovolts. Such ions can exceed the potential at the entrance to the electron multiplier causing an unwanted response.

In commonly assigned U.S. Pat. No. 5,291,017 to Wang, et al., the disclosure of which is incorporated by reference, it was recently shown that an asymmetrical trapping field, comprising quadrupole and dipole components, could be used to preferentially eject ions in a preferred direction. In the Wang, et al., patent a supplemental dipole field is used to eject ions in a scanning operation. It has been determined that the effect of the asymmetrical field used disclosed in Wang, et al., is to displace the center of the trapping field away from the mechanical center of the trap, and to separate positive and negative ions from each other.

An additional disadvantage of the prior art resonance scanning technique using resonant ejection where the frequency of the supplemental voltage is approximately one-half of the trapping voltage is the fact that a substantial beat frequency is present which presents a noticeable distortion of the mass peaks. Typically, this is mitigated by averaging the mass spectra from several successive scans of the on trap. However, the flow from a GC is continuous, and a modern high resolution GC produces narrow peaks, sometimes lasting only a matter of seconds. In order to obtain a mass spectrum of narrow peaks, it is necessary to perform at least one complete scan of the ion trap per second. The need to perform rapid scanning of the trap adds constraints which may also affect mass resolution and reproducibility. Similar constraints exist when using the ion trap with an LC or other continuously flowing, variable sample stream. Averaging scans in order to obtain accurate mass peaks reduces the scan cycle time and hence the number of different masses that can be monitored per unit time across a chromatographic peak. It is noted that the time for a single scan is more than just the scan time itself, since it must also include the ionization and ion isolation time, both of which are generally longer than the scan itself. Therefore, scan averaging for purposes of peak smoothing is an inherently inefficient process.

SUMMARY OF THE INVENTION

Accordingly, it is an object of the present invention to provide an improved method of scanning the contents of an ion trap mass spectrometer to obtain a mass spectrum of the ions masses which have been isolated within the trap volume.

A further object of the present invention is to improve the mass resolution of a scan of the ion trap without appreciably increasing the time required to conduct a scan.

Another object of the present invention is to provide an asymmetrical trapping field to displace the center of ion orbits away from the mechanical center of the ion trap.

Yet another object of the present invention is to reduce the time needed to obtain a smooth, accurately centered mass peak of an ion species which has been isolated in an ion trap.

Still another object of the present invention is to provide a trapping field which separates positive ions from negative ions.

Yet another object of the present invention is to increase the proportion of ions ejected from an ion trap which are subject to capture by an external detector such that substantially more than one half of the ions are detected.

These and other objects which will be apparent to those skilled in the art upon reading the present specification in conjunction with the attached drawings and the appended claims, are realized in the present invention comprising a method of using an ion trap mass spectrometer comprising the steps of applying an asymmetrical trapping field to the trap so that ions having mass to charge ratios within a desired range will be stably trapped within an ion storage region within the ion trap, such that the center of the ion storage region is offset from the mechanical center of the ion trap; introducing a sample into the ion trap mass spectrometer, ionizing the sample and applying a supplemental quadrupole excitation field to the ion trap to form a combined field and scanning the combined field to cause sample ions to be resonantly ejected from the trap. Preferably, the asymmetrical trapping field comprises a quadrupole field, and a dipole field having the same frequency, and the end cap electrodes of said ion trap are "stretched." In the preferred embodiment the supplemental quadrupole field which causes ion ejection is too weak to trap ions in the ion trap. In a further embodiment, a supplemental dipole field is applied to the ion trap while the trap is being scanned, and the supplemental quadrupole field and the supplemental dipole field have a frequency which is ⅔ of the frequency of the trapping field. In yet a further embodiment, an additional supplemental excitation field having a frequency which is ½ of the supplemental quadrupole frequency is also applied to the ion trap. Preferably, the trapping field voltages and the supplemental voltages are phase locked.

DETAILED DESCRIPTION

Figure 1:
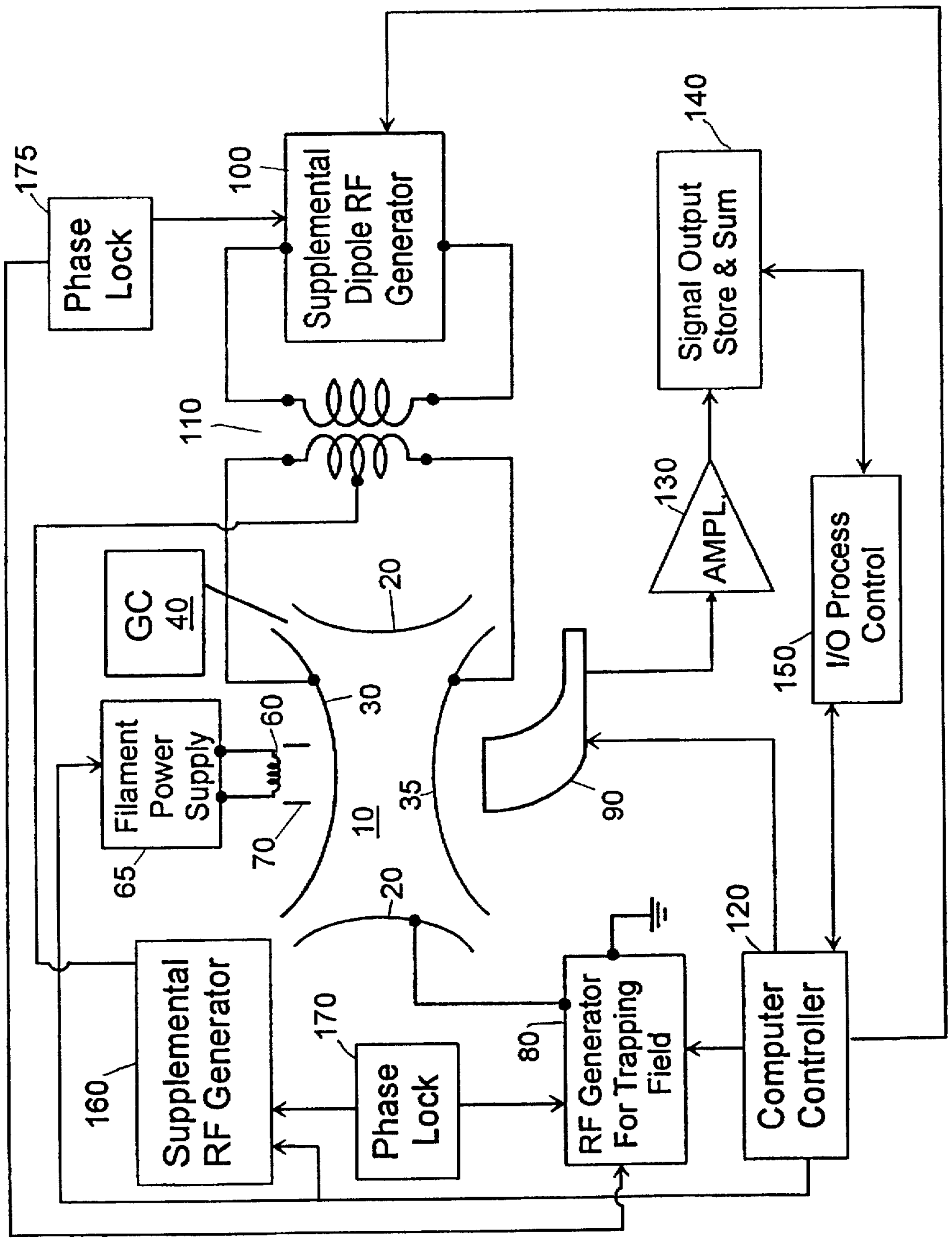
FIG. 1 is a partially schematic cross-sectional illustration of an ion trap of the type which is used to practice the methods of the present invention.

Apparatus of the type which may be used in performing the method of the present invention is shown in FIG. 1. Most of what is depicted in FIG. 1 is well known in the art, and need not be explained in detail. Ion trap 10, shown schematically in cross-section, comprises a ring electrode 20 coaxially aligned with upper and lower end cap electrodes 30 and 35, respectively. These electrodes define an interior trapping volume. Preferably, end cap electrodes 30 and 35 have inner surfaces with a cross-sectional shape which is "stretched." As used herein the term "stretched," when referring to the end cap electrodes, means electrodes which have the ideal hyperbolic shape, as taught by Paul, et al., but which are displaced from their ideal separation along the z-axis to induce higher order field components. The z-axis displacement is equal for each electrode, such that only even order multipole (e.g., octopole, etc.) field components are introduced. Those skilled in the art will appreciate that other techniques may also be used to introduce higher order field components, such as changing the shape of the electrode surfaces to depart from the ideal hyperbolic. For example, shapes which are more convex than hyperbolic may be used. It is also known that shapes which are not ideal, for example, electrodes having a cross-section forming an arc of a circle, may also be used to create trapping fields that are adequate for many purposes. Moreover, by using end caps which are the same, but which are not equally displaced, or which have different shapes, one can introduce odd order (e.g., hexapole) field components will be added. As described, the preferred stretched end cap electrodes introduce only even order higher order field components. The design and construction of ion trap mass spectrometers are well-known to those skilled in the art and need not be described in detail. A commercial model ion trap of the type described herein is sold by the assignee hereof under the model designation "Saturn."

Sample, for example from gas chromatograph ("GC") 40, is introduced into the ion trap 10. Since GCs typically operate at atmospheric pressure while ion traps operate at greatly reduced pressures, pressure reducing means (e.g., a vacuum pump and appropriate valves, etc., not shown) are required. Such pressure reducing means are conventional and well known to those skilled in the art. While the present invention is described using a GC as a sample source, the source of the sample is not considered a part of the invention and there is no intent to limit the invention to use with gas chromatographs. Other sample sources, such as, for example, liquid chromatographs ("LCs") with specialized interfaces, may also be used. For some applications, no sample separation is required, and sample gas may be introduced directly into the ion trap.

A source of reagent gas (not shown) may also be connected to the ion trap for conducting chemical ionization ("CI") experiments. Sample (and optionally reagent) gas that is introduced into the interior of ion trap 10 may be ionized by using a beam of electrons, such as from a thermionic filament 60 powered by filament power supply 65, and controlled by a gate electrode 70, which, in turn is controlled by the master computer controller 120. The center of upper end cap electrode 30 is perforated (not shown) to allow the electron beam generated by filament 60 to enter the interior of the trap. When gated "on" the electron beam enters the trap where it collides with sample and, if applicable, reagent molecules within the trap, thereby ionizing them. Electron impact ionization ("EI") of sample and reagent gases is also a well-known process that need not be described in greater detail. Of course, the method of the present invention is not limited to the use of electron beam ionization within the trap volume. Numerous other ionization methods are also well known in the art. For purposes of the present invention, the ionization technique used to introduce sample ions into the trap is generally unimportant.

Although not shown, more than one source of reagent gas may be connected to the ion trap to allow experiments using different reagent ions, or to use one reagent gas as a source of precursor ions to chemically ionize another reagent gas. In addition, a background gas is typically introduced into the ion trap to dampen oscillations of trapped ions. Such a gas may also be used for collisionally induced dissociation of ions, and preferably comprises a species, such as helium, with a high ionization potential, i.e., above the energy of the electron beam or other ionizing source. When using an ion trap with a GC, helium is preferably also used as the GC carrier gas.

A trapping field is created by the application of an RF voltage having a desired frequency and amplitude to stably trap ions within a desired range of masses. RF generator 80 is used to create this field, and is applied to ring electrode 20. The operation of RF generator 80 is, preferably, under the control of computer controller 120. A DC voltage source 250 (shown in FIG. 2) may also be used to apply a DC component to the trapping field as is well known in the art.

However, in the preferred embodiment, no DC component is used in the trapping field.

Computer controller 120 may comprise a computer system including standard features such as a central processing unit, volatile and non-volatile memory, input/output (I/O) devices, digital-to-analog and analog-to-digital converters (DACs and ADCs), digital signal processors and the like. In addition, system software for implementing the control functions and the instructions from the system operator may be incorporated into non-volatile memory and loaded into the system during operation. These features are all considered to be standard and do not require further discussion as they are not considered to be central to the present invention.

As is explained in greater detail hereinafter, periodically ions are scanned out of ion trap 10 to produce a mass spectrum of the contents of the trap. Such scanning may be performed routinely, for example, to continuously monitor the substances present in the outflow from GC 40, or may be performed after an experiment is conducted in the ion trap, such as an MS/MS manipulation. According to the present invention, ions are scanned out of the trap in sequential mass order and are detected by an external detector such as electron multiplier 90, which is also subject to the control of computer controller 120. The output from electron multiplier 90 is amplified by amplifier 130, and the signal from amplifier 130 is stored and processed by signal output store and sum circuitry 140. Data from signal output store and sum circuitry 140 is, in turn, processed by I/O process control card 150. As noted above, I/O card 150 is controlled by computer controller 120. The details of how components 90, 130, 140 and 150 operate are well known and need not be described in further detail.

The supplemental dipole voltage(s) used in the ion trap may be created by a supplemental waveform generator 100, coupled to the end cap electrodes 30, 35 by transformer 110. Supplemental waveform generator 100 is of the type which is not only capable of generating a single supplemental frequency component for dipolar resonance excitation of a single species, but is also capable of generating a voltage waveform comprising of a wide range of discrete frequency components. Any suitable arbitrary waveform generator, subject to the control of controller 120, may be used to create the supplemental waveforms used in the present invention. According to the present invention, a multifrequency supplemental waveform created by generator 100 is applied to the end cap electrodes of the ion trap, while the trapping field is modulated, so as to simultaneously resonantly eject multiple ion masses from the trap, as in an ion isolation procedure. A method of generating a supplemental signal for isolating selected ion species is described in detail below. Supplemental waveform generator 100 may also be used to create a low-voltage resonance signal to fragment parent ions in the trap by CID, as is well known in the art.

As with most any instrument of its type, it is known that the dynamic range of an ion trap is limited, and that the most accurate and useful results are attained when the trap is filled with the optimal number of ions. If too few ions are present in the trap, sensitivity is low and peaks may be overwhelmed by noise. If too many ions are present in the trap, space charge effects can significantly distort the trapping field, and peak resolution can suffer. The prior art has addressed this problem by using a so-called automatic gain control (AGC) technique which aims to keep the total charge in the trap at a constant level. In particular, prior art AGC techniques use a fast "prescan" of the trap to estimate the charge present in the trap, and then use this prescan to control a subsequent analytical scan. According to the present invention, a prescan may also be used to control space charge and optimize the contents of the trap for an analytical scan. Alternately, the technique described in co-assigned U.S. Pat. No. 5,479,012 may be used to control space charge.

According to the present invention, an asymmetrical trapping field is employed. Preferably, the trapping field is constructed from a combination of dipole and quadrupole components all having the same frequency $f$. In addition, if stretched end cap electrodes are used, higher order field components (e.g., octopole) are inherently introduced into the trapping field. Further, as described below, the "dipole" component of the trapping field inherently causes higher order odd order field component to be present in the trapping field, the predominant one being a hexapolar component. The asymmetrical trapping field used in accordance with the present invention has a center which is displaced from the mechanical center of the ion trap, (as defined by the electrode geometry). This is described in greater detail in coassigned U.S. Pat. No. 5,291,017, to Wang, et al., the disclosure of which is incorporated by reference. As noted, a damping gas is used in the ion trap and the collisionally damped trapped ions become positioned near and orbit about the center of the trapping field after ionization is completed. The inventors have determined that the secular frequencies of the ions trapped in an asymmetrical field are substantially the same as if they were trapped in a symmetrical field, but that the centers of the orbits are displaced in the axial direction.

As used herein, and as is common among those skilled in the art, the term "dipole voltage" refers to a AC voltage applied across the end cap electrodes of the ion trap, such that one end cap receives a positive potential while the opposing end cap receives a negative potential of equal magnitude, (the potentials being relative to each other). More precisely, however, since the end caps are not parallel plates, the resultant field is not a pure dipole field, and inherently has higher order field components. As described below, one of the higher order field components is a hexapolar field which is used, in accordance with a preferred embodiment, to help excite ions out of the trap during mass scanning.

Figure 2:
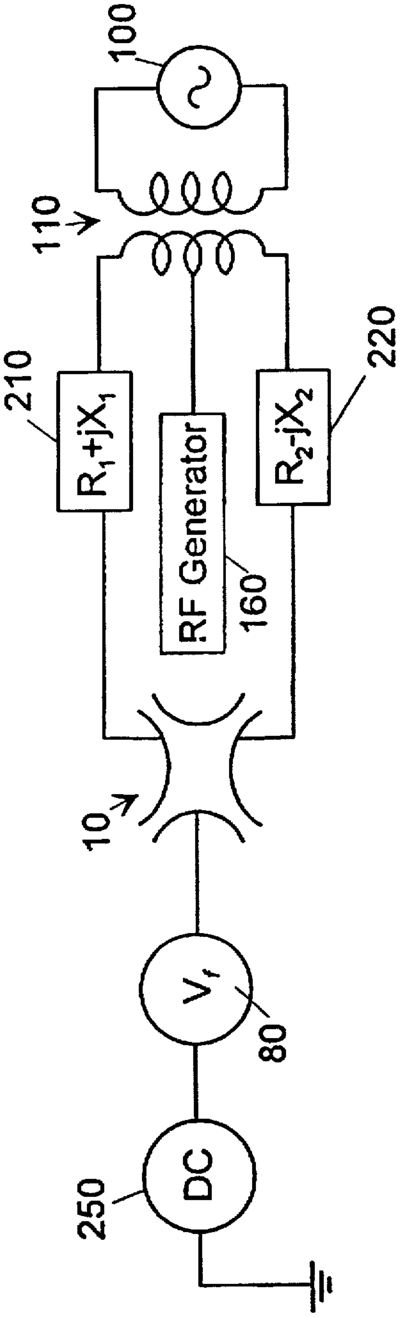
FIG. 2 is a schematic representation of a circuit used in the ion trap of the present invention.

In the preferred embodiment, the dipole component of the asymmetrical rf trapping field is passively created by using unequal lumped parameter impedances 210, 220 as shown in FIG. 2. This technique for generating the different components of the trapping field results in the components all having the same relative phase. The dipole component must be considered as being part of the trapping field as it has the same frequency and relative phase as the quadrupole trapping voltage. It is further noted that none of the trapped ions have secular frequencies which are the same as the frequency $f$ of the trapping voltage. Therefore, the additional dipole trapping field component does not contribute to the ejection of ions by resonant excitation. Alternatively, a supplemental dipole voltage generator 100 may be used to actively create a dipole component of the trapping field. In such an embodiment, the phase of the supplemental dipole should be controlled to be the same as the quadrupole component. In yet another variation, both passive and active dipole components may be added to the trapping field. These latter embodiments permit variation in the ratio between the voltage of the dipole and quadrupole components for both the trapping field and the excitation field.

Briefly, the impedances which are used to create the dipole take into account the capacitances between the end cap and ring electrodes ("$C_{re}$"), the capacitances between the end electrodes and ground ("$C_{eg}$"), and impedances 210 and 220 as shown in FIG. 2. In commercial ion traps, with mirrored symmetry (i.e., the end cap electrodes are the same shape and same displacement along the z-axis); $C_{re1}=C_{re2}$ and $C_{re}<<C_{eg}$. The dipole is created by the large and equal current flowing from trapping field rf generator 80 through $C_{re1}$ and $C_{re2}$. This current also flows through impedances 210 and 220 to create unequal voltage drops thereby causing different voltages to be applied to the two end caps, and thereby causing a dipole voltage across the end caps. The supplemental (excitation) field dipole is created by the voltage divider action of impedance 210 and $C_{eg1}$ as to the first end cap electrode 30 and the voltage and by the voltage divider action of impedance 220 and $C_{eg2}$ as to the second end cap electrode 35. A dipole voltage is created when the two voltage divider ratios are unequal. Since the value of $C_{eg}$ is largely set by the mechanical design of the ion trap, additional impedances $Z_{eg}$ (not shown) may be added to provide an extra degree of freedom. The determination of the impedance values of $Z_{eg}$, and 210 and 220 may be done by standard electrical engineering analysis and synthesis techniques known to those skilled in the art. According to the preferred embodiment of the present invention the quadrupole component of the trapping field is created by the ring electrode, whereas the quadrupole component of the excitation field is created by the end cap electrodes. In addition, the trapping and excitation fields operate at different frequencies. Thus, impedances in the system, discussed above, operate differently on the voltages used to create the various field components. By appropriately choosing the values of the impedances added to the system, one can vary the relative proportion of quadrupole and dipole components in the fields. For, example, by appropriate selection, it is possible to create a trapping field with a significant dipole component, while creating an excitation field with little or no dipole component.

While the present invention is described using voltage generators applied either to the ring electrode and/or across the end cap electrodes, it will be apparent to those skilled in the art that independent voltage sources can be applied to each of the three electrodes in the trap. Such voltage sources could, for example, be arbitrary waveform generators under the controlled of computer controller 120.

The effect of the using an asymmetrical trapping field of the present invention is to greatly increase the percentage of ions, ejected from the ion trap during a scanning operation, which are directed to the detector. As noted above, when scanning using prior art symmetrical trapping fields, approximately half of the ions leave the trap in each axial direction. In addition, it has recently been discovered that the asymmetrical trapping field of the present invention causes positive and negative ions to be separated from each other, thereby obviating peak artifacts associated with scanning negative ions with sufficient energy to overcome the bias voltage of the electron multiplier. Such unwanted peak artifacts due to negative ions are common when scanning using a symmetrical trapping field.

In its basic form the present invention uses an excitation field for ion ejection comprising a weak supplemental quadrupole field which is centered at the mechanical center of the ion trap. As shown in FIGS. 1 and 2, the quadrupole excitation field is created by applying the signal from supplemental voltage generator 160 to the center tap of the secondary coil of transformer 110. In this manner, the supplemental quadrupole excitation field is applied to the end cap electrodes so that this voltage signal does not interfere with the high-Q circuit used to apply the quadrupole trapping voltage to the ring electrode. Therefore, the center of the trapping field and the center of the weak supplemental excitation field are displaced from each other. This enables the supplemental quadrupole field to act on the trapped ions, since the supplemental quadrupole field is non-zero at the center of the trapping field. As used in the present specification, the term "weak supplemental quadrupole field" means that the field is not strong enough to independently trap a measurable number of ions. According to the preferred embodiment of the present invention, the frequency ω of the supplemental quadrupole excitation field is set at two-thirds (⅔) of the trapping field frequency, $\omega/f=⅔$.

It is sometimes helpful to consider that the asymmetrical trapping field and the supplemental excitation field (which may include additional components as described below) act on ions within the trap as a single combined field. According to the present invention, one of the characteristics of this combined field is then scanned to bring ions into resonance with the supplemental excitation field in sequential mass order, thereby ejecting them from the ion trap for detection. Preferably, the voltage of the quadrupole component of the trapping field is scanned (i.e., linearly increased) to perform the mass scan. Other techniques for scanning the combined field are known to those skilled in the art and could also be used. However, such techniques are often more complicated and, therefore, less preferred. In addition, it is preferred to maintain the two-thirds relationship between the frequency $f$ of the trapping voltage and the frequency ω of the excitation voltage, and, therefore frequency scanning is also not preferred for this reason.

In U.S. Pat. No. 3,065,640, Langmuir taught that a supplemental quadrupole field with a frequency $\omega_p$ will have quadrupole axial parametric resonances that are related to the axial secular frequencies $\omega_z$ by the equation $\omega_p=2\omega_z/N$ where N is a positive integer. Thus, the parametric frequencies are always less than or equal to twice one of the secular frequencies. It was also shown that a quadrupole excitation field at these frequencies will result in the exponential growth of axial oscillation. However, in the past, a limitation on the use of quadrupole excitation has been the fact that a quadrupole (or higher order) excitation field is zero at the center of the field. In the prior art, use of a quadrupole excitation field has been limited to symmetrical trapping fields, such that the center of the trapping field and the center of the excitation field where both at the mechanical center of the ion trap. Various techniques have been proposed to overcome this limitation, including using a dipole excitation field to move ions away from the center of the trapping field where they can be acted upon by the quadrupole excitation field, or using a very strong quadrupole excitation field, i.e., a supplemental quadrupole field which is strong enough to act as a trapping field. These solutions have not been satisfactory.

According to the present invention, the center of the quadrupole excitation field does not coincide with the center of the asymmetrical trapping field. Thus, a weak quadrupole excitation field is able to act directly on the ions trapped in the asymmetrical trapping field because the ions are trapped in a region of the excitation field which is non-zero. Accordingly, the ions will be ejected from the ion trap by resonant excitation without the need to use a supplemental dipole field. In the preferred embodiment, ions are sequentially brought into resonance with the supplemental excitation field by increasing the amplitude of the trapping field which, in turn, changes the respective resonant frequencies of the trapped ions.

Preferably, the supplemental excitation voltage also includes a dipole component in addition to the quadrupole component. This additional dipole component should have the same frequency ω as the quadrupole excitation field, preferably two-thirds of the trapping field frequency. The supplemental dipole component of the excitation field can be created in the same manner as the corresponding component of the trapping field, e.g., using unequal lumped parameter impedances 210 and 220, and/or using a phase locked active dipole voltage generator 100.

Again, the passive approach has the advantage of easily assuring that the various field components have the same relative phase and reduced hardware requirements. The supplemental dipole field may be weak, such that it would not, acting alone, be capable of ejecting ions from the ion trap. Mass resolution is enhanced by minimizing all of the excitation field components, including the dipole field.

It is well-known that the axial secular frequencies of the trapped ions have values $\omega_N=(2N+\beta)f/2$ where N is an integer and β is related to the operating point of the trap. Previously, spectroscopists have used N=0 because the coupling coefficient is greatest for this value of N. (As the absolute value of N increases, the coupling coefficient decreases.) Thus, previously, there has been no recognized advantage for using a value of N other than 0. The present invention uses N=−1 to gain a heretofore unrecognized advantage. By way of example, assume that $f$=1050 kHz and $\omega_p$=700 kHz. If the fundamental secular frequency (i.e., N=0) is used to excite the parametric oscillation, then it would be at 350 kHz and would require an additional rf generator. However, if $\beta=2/3$ is selected as the operating point, the N=−1 harmonic of the secular motion would be at 700 kHz and, thus, a quadrupole field at this frequency would also act to excite the parametric oscillation. Thus, the selection of this combination of operating points and frequencies eliminates the need for an additional rf generator. In addition, this combination permits phase locking of the trapping field and the excitation field in a simple manner since the frequencies of the two fields have an integer relationship. Likewise, the trapping field dipole and the supplementary excitation field dipole can easily be phase locked while still using passive components, as described in connection with FIG. 2. Finally, the technique of the present invention allows a linear increase in the supplemental quadrupole strength and dipole strength, e.g., respective voltages applied to the end caps, while maintaining a constant ratio between them, as the amplitude of the trapping voltage is increased during a scan. It can be shown from the equations of motion that it is advantageous to maintain a constant ratio between the excitation voltage and the trapping voltage. Specifically, as recognized by the inventors hereof when an asymmetrical trapping field is used in conjunction with a quadrupole excitation field, such that trapped ions are displaced from the center of the ion trap, the degree of excitation of ions is mass dependent. Specifically, as taught herein in connection with the preferred embodiment, there should be a constant ratio maintained between the field strengths of the dipole and quadrupole components of the trapping field scanning the trap in order for ion displacement to be independent of mass. This is not recognized in the prior art.

As described above, when a dipole voltage is applied to end caps electrodes, higher odd order field components are also created, the predominant added field component being a hexapolar field. It can be shown that when using an operating point of $\beta=2/3$ ions are also in resonance with the hexapolar component of the trapping field. As will be appreciated, the magnitude of the hexapolar field is a function of the magnitude of the dipole component of the trapping field. When using low dipole voltages, e.g., less than about 5% relative to the quadrupole voltage, then the hexapole component is too small to significantly affect the ejection process. However, when using a stronger dipole trapping field component, greater than 5% or, preferably greater than 10% of the quadrupole trapping voltage, then the hexapole component is significant and contributes to ion ejection when $\beta=2/3$. In accordance with the present invention, the assistance in ejecting ions caused by this added field component appreciably improves mass resolution when scanning the ion trap and increases the fraction of ions that are ejected in a desired direction.

While the use of hexapole fields is known in the prior art, such prior art fields have been created by shaping the electrodes of the ion trap. These mechanical methods of creating hexapole fields have a number of limitations which are overcome by the electrical technique of the present invention. When mechanical means are used to form a hexapole field, the relative position or "polarity" of the field is fixed. In contrast, when the hexapole field component is created electrically, its polarity or relative position can be reversed or otherwise modified by changing the relative phase of the quadrupole and dipole components of the trapping field. This can be important since the behavior of positive and negative ions in the trapping field is affected differently by a trapping field having a hexapole component. Depending on whether one is experimenting on positive or negative ions, one may want to reverse the polarity of the hexapole field component. Moreover, according to the present invention, it is possible to employ a symmetrical trapping field during the ion formation stage of an experiment and then apply an asymmetrical trapping field afterwards. During ion formation, ions tend to be distributed throughout the entire volume of the ion trap, and ions which are not near the center are subject to ejection due to the resonance with the hexapole field. After the ions are thermalized or damped to the center of the ion trap they are no longer susceptible to unwanted resonant ejection in this manner. Finally, the relative proportion of the hexapole and quadrupole components of the trapping field is fixed in a mechanical system, whereas the proportion can be varied, if desired, when the hexapole field is generated electrically.

By using a set integer ratio between $f$ and ω, as in the present invention, it is possible to assure phase locking between the trapping voltages and the excitation voltages, thereby eliminating the effects of frequency beating. It is particularly advantageous to utilize the smallest possible integer ratio between these frequencies (e.g., 2:3) consistent with the other objects of the invention, because the advantages of phase locking will occur (and be repeated) in the smallest number of cycles. Phase lock circuitry 170, of the type which is well known in the art, is used to lock the phases of the voltages created by the trapping field generator 80 and the supplemental excitation field generator 160. When using a supplemental dipole excitation source, e.g., voltage source 100 in FIG. 1, an additional phase lock circuitry 175 is, preferably also used.

For the case of a symmetrical trapping field of the prior art, ions having a center of oscillation at the geometric center of the trap initially experience very little effect from a substantially quadrupole excitation applied symmetrically from the end caps, because the thermalized ions are trapped in a region of approximately null field. It is known to apply an excitation field having both dipole and quadrupole components whereby the trapped ions are first affected by the dipole component. Power is promptly absorbed from the dipole resonance and the resonantly mass selected ions are subject to greater axial amplitude oscillation. As a result of the greater axial amplitude, these ions then absorb power from the mass selective resonant quadrupole field component. This sequential process, governing the symmetric arrangement of prior art is to be contrasted with the present invention wherein the mass independent center of oscillation of the trapping field is displaced from the central region of the mass selective combined dipole quadrupole excitation field. See U.S. Pat. No. 5,347,127 to Franzen where the sequential nature of the prior art is deliberately emphasized.

Figure 3:
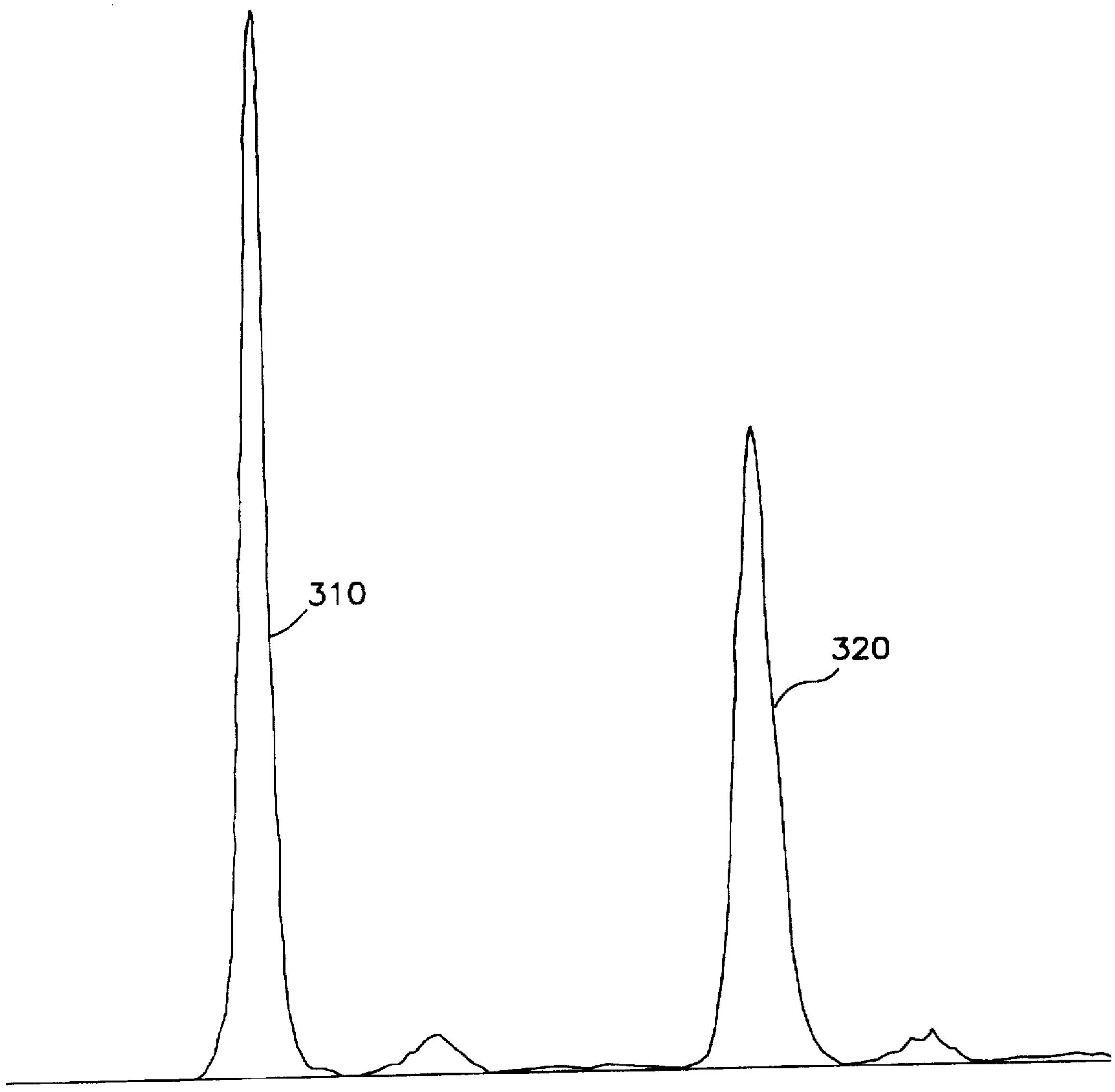
FIG. 3 is a graph of two mass spectra obtained under identical conditions using a symmetrical trapping field and an asymmetrical trapping field.

FIG. 3 compares the method of the present invention, i.e., using an asymmetrical trapping field, with the same method but using a symmetrical trapping field, as discussed above. The mass scan on the left side of FIG. 3, curve 310, was acquired used the method of the present invention, while the mass scan on the right side of FIG. 3, curve 320, was acquired using a symmetrical trapping field. In both instances, the supplemental excitation field comprised a quadrupole voltage and a dipole voltage of the same phase. It is apparent that the asymmetrical trapping field of the present invention, combined with a excitation voltage comprising quadrupole and dipole components, produces a higher intrinsic rate of ion ejection with a resulting better resolution and peak intensity. From a qualitative point of view the present invention provides a concurrent effect of both quadrupole and dipole excitation components rather than the sequential effect of the prior art because the relative displacement of the center of ion density is achieved by the asymmetrical trapping field. Accordingly, the mass selected ions are ejected promptly in time. For a given scan rate this clearly results in a more precise mass resolution than would be achievable for a less rapid ejection rate.

Figure 4:
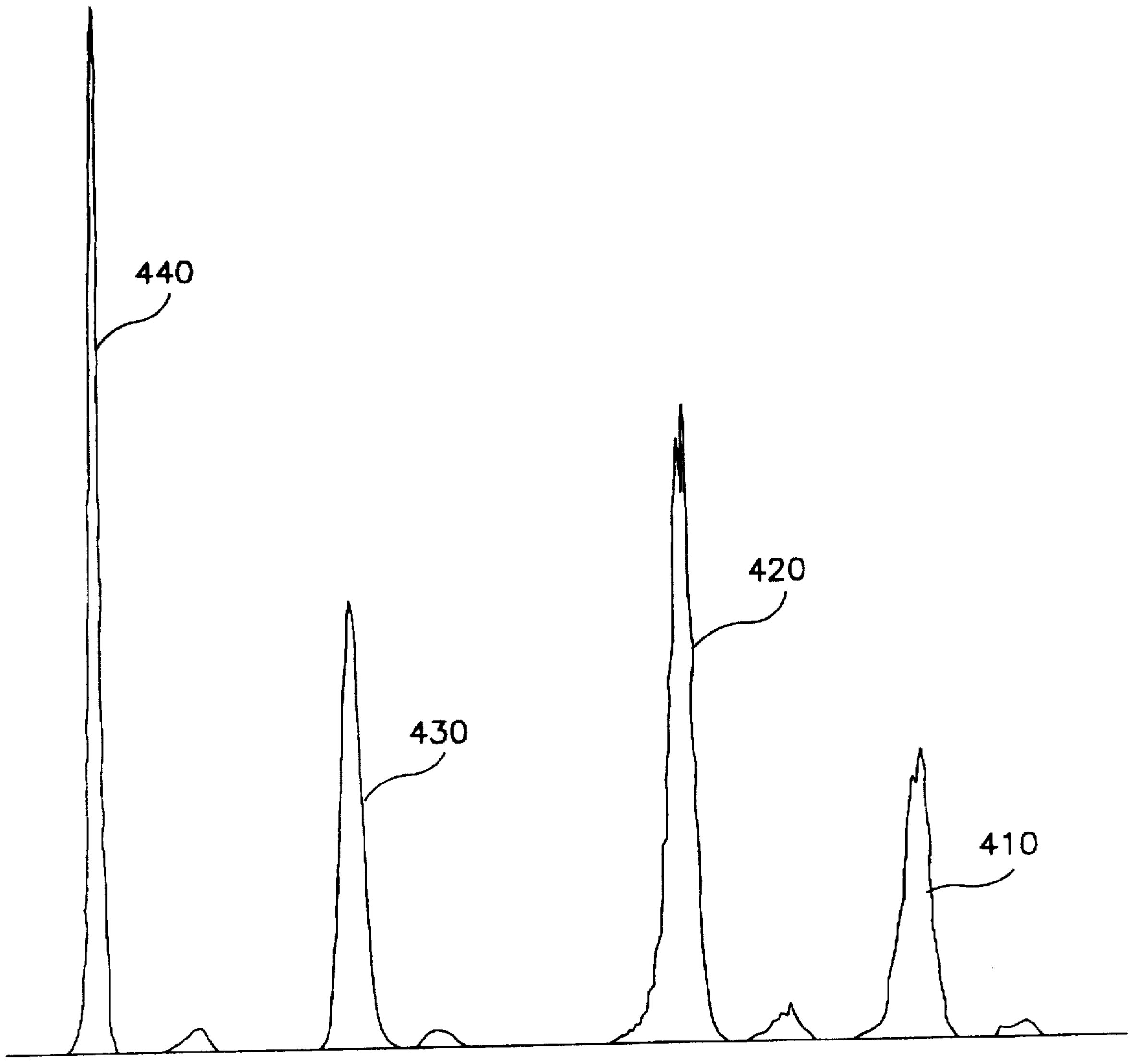
FIG. 4 is a graph of four mass spectra showing the results obtained using four different scanning techniques.

FIG. 4 compares various scanning techniques. The mass scan 410 is the prior art resonant ejection technique using a dipole excitation voltage in a symmetrical trapping field. As described above, the frequency of the excitation voltage ($\omega_s$=485 kHz) is set at about one half of the trapping field frequency ($f$=1050 kHz) as taught in the prior art. Noticeable distortions in the mass peak may be observed due to frequency beating. Mass scan 420 is taken under identical conditions using the asymmetrical trapping field of Wang, et al. While the height of the peak is higher due to the fact that ions are preferentially ejected towards the detector, the mass resolution is substantially the same. The effects of frequency beating are, again, noticeable. Mass scan 430 uses a symmetrical trapping field and an excitation voltage comprising both quadrupole and dipole components at a frequency ($\omega_d$=$\omega_q$=700 kHz) which is set at two-thirds of the trapping field frequency, $f$=1050 kHz. In curve 430 there is no noticeable frequency beating, and the mass resolution is slightly improved over scans 410 and 420. Finally, scan 440, according to the preferred embodiment of present invention, was taken under identical conditions as scan 430, but using an asymmetrical trapping field. Note that the mass resolution is greatly improved over any of the other scans, there is no noticeable frequency beating, and the peak height is far better than the other scans.

It is specifically recognized that the displacement of the center of oscillation of ions by the trapping field from the central region of the excitation field facilitates manipulation of trapped ion populations generally. By way of example, ion isolation procedures yield improved result because the simultaneous absorption of power from dipole and quadrupole fields (in contrast to sequential resonant absorption) allows for a more rapid mass selected ion ejection. The time spent in exciting masses greater than, and less than a selected mass is therefore minimized. The selected mass, which may be inherently unstable or which is subject to dissociation, is therefore available for a greater time interval for isolated ion processes.

References herein to the excitation field are not limited to an excitation field characterized by a single discrete frequency. Broadband excitation comprising a plurality of frequency components is well known for the purpose of providing excitation to a selected range, or ranges of ion mass. The selection and phasing of the frequency components of the broad band waveform are well known in the art. Each such frequency component herein contains quadrupolar and preferably both quadrupolar and dipolar multipolarity.

While the present invention has been described in connection with the preferred embodiments thereof, those skilled in the art will recognize other variations and equivalents to the subject matter described. Therefore, it is intended that the scope of the invention be limited only by the appended claims.

What is claimed is:

1. A method of using an ion trap mass spectrometer comprising the steps of:

applying an asymmetrical trapping field comprising a quadrupole and a dipole field having the same frequency to the ion trap mass spectrometer so that ions having mass to charge ratios within a desired range will be stably trapped within an ion storage region within the ion trap; such that the center of the ion storage region is offset from the mechanical center of the ion trap introducing a sample into the ion trap mass spectrometer;

ionizing the sample;

applying a supplemental quadrupole excitation field to the ion trap to form a combined field and scanning the combined field to cause sample ions to be resonantly ejected from the trap.

2. The method of claim 1 wherein said dipole is passively created.

3. The method of claim 1 wherein said quadrupole component of said trapping field is created by applying an RF voltage to a ring electrode of the ion trap.

4. The method of claim 3 wherein said dipole component of said trapping field is created by applying an AC voltage across end cap electrodes of the ion trap.

5. The method of claim 4 wherein the end cap electrodes of said ion trap are stretched.

6. The method of claim 4 wherein a significant hexapole field component is created.

7. The method of claim 6 wherein said dipole voltage is greater than 5% of the quadrupole trapping field voltage.

8. The method of claim 1 wherein said supplemental quadrupole excitation field is too weak to trap a measurable number of ions in the ion trap.

9. The method of claim 8 further comprising the step of applying a supplemental dipole excitation field to the ion trap while the trap is being scanned.

10. The method of claim 9 wherein the supplemental quadrupole excitation field and the supplemental dipole excitation field have a frequency which is $2/3$ of the frequency of the trapping field.

11. The method of claim 10 wherein said trapping field voltages and said supplemental excitation field voltages are phase locked.

12. The method of claim 9 wherein the strength of said dipole component and the strength of said quadrupole component are maintained at a constant ratio.

13. The method of claim 1 further comprising the step of applying a supplemental dipole excitation field having a frequency which is ½ of the supplemental quadrupole frequency.

14. A method of scanning an ion trap mass spectrometer, comprising the steps of:

establishing a trapping field within the ion trap, said trapping field having an electrical center within a central region wherein trapped ions substantially reside, applying an excitation field having an electrical center and comprising a quadrupole field to the ion trap, the electrical center of said excitation field being displaced from said central region of said trapping field, such that the quadrupole component of said excitation field acts on trapped ions residing in said central region; and scanning a parameter of said trapping field or of said excitation field to cause ions trapped in said ion trap to be resonantly ejected from said ion trap in sequential mass order.

15. The method of claim 13 wherein trapping field comprises dipole and quadrupole components.

16. The method of claim 15 wherein said dipole component of said trapping field is passively created.

17. The method of claim 15 wherein said trapping field comprises a hexapole component, and the operating point of the trap is set at $\beta=2/3$.

18. The method of claim 15 wherein said dipole and quadrupole trapping voltages are phase locked.

19. The method of claim 15 wherein said dipole field is actively created.

20. The method of claim 15 wherein the strengths of said dipole and quadrupole components are maintained at a constant ratio.

21. The method of claim 14 wherein said excitation field further comprises a dipole field.

22. The method of claim 21 where said dipole field is passively created.

23. The method of claim 21 wherein said dipole field contains both active and passive components.

24. The method of claim 14 wherein said quadrupole component of said excitation field is too weak to trap ions.

25. The method of claim 14 wherein said trapping field and said excitation field are phase locked.

26. A method of using an ion trap mass spectrometer comprising the steps of:

applying a symmetrical trapping field to an ion trap, so that ions having mass to charge ratios within a desired range will be stably trapped within an ion storage region within the ion trap;

introducing sample ions into the trap;

changing the trapping field so that it is asymmetrical, such that the electrical center of the ion storage region is offset from the mechanical center of the ion trap applying a supplemental quadrupole excitation field to the ion trap to form a combined field and scanning the combined field to cause sample ions to be resonantly ejected from the trap.

27. A method of operating an ion trap mass spectrometer, comprising (a) establishing a trapping field within said ion trap, said trapping field having a central trapping region wherein said trapped ions substantially reside, and (b) applying an excitation field to said ion trap, said excitation field having a central excitation region displaced from said central trapping region.

28. The method of claim 27 wherein said trapping field comprises a plurality of multipole components.

29. The method of claim 28 wherein said excitation field comprises a plurality of frequency components.

30. The method of claim 27 wherein said excitation field comprises a plurality of multipole components.

31. The method of claim 30 wherein said excitation field comprises a plurality of frequency components.

* * * * *